(12) United States Patent
Miseki (10) Patent No.: US 12,330,451 B2
(45) Date of Patent: Jun. 17, 2025

(54) PNEUMATIC TIRE

(71) Applicant: Sumitomo Rubber Industries, Ltd., Kobe (JP)

(72) Inventor: Yuta Miseki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/286,444

(22) PCT Filed: Mar. 9, 2022

(86) PCT No.: PCT/JP2022/010235
§ 371 (c)(1),
(2) Date: Oct. 11, 2023

(87) PCT Pub. No.: WO2022/224610
PCT Pub. Date: Oct. 27, 2022

(65) Prior Publication Data
US 2024/0190177 A1    Jun. 13, 2024

(30) Foreign Application Priority Data

Apr. 22, 2021 (JP) ................................. 2021-072796

(51) Int. Cl.
*B60C 9/22* (2006.01)
*B60C 11/00* (2006.01)
(Continued)

(52) U.S. Cl.
CPC .... *B60C 11/033* (2013.01); *B60C 2009/2064* (2013.01); *B60C 2009/2067* (2013.01);
(Continued)

(58) Field of Classification Search
CPC ............................................ B60C 2009/2247
See application file for complete search history.

(56) References Cited

U.S. PATENT DOCUMENTS 5,558,144 A * 9/1996 Nakayasu ............. B60C 9/2204
152/526
5,766,383 A * 6/1998 Hasegawa ........... B60C 11/0318
152/209.27
(Continued)

FOREIGN PATENT DOCUMENTS

EP     3 287 299 A1    2/2018
EP     3 287 300 B1    6/2019
(Continued)

OTHER PUBLICATIONS

Machine Translation: JP-2011218980-A, Sunagawa K, (Year: 2024).*
(Continued)

*Primary Examiner* — Kendra Ly
(74) *Attorney, Agent, or Firm* — Birch, Stewart, Kolasch & Birch, LLP (57) ABSTRACT

A pneumatic tire comprises a tread portion provided with a band layer disposed radially inside a tread rubber provided with a first circumferential groove. Cords of the band layer are a hybrid cord formed by twisting together a first filament and a second filament having an elastic modulus lower than that of the first filament. In a region radially inside the first circumferential groove, a maximum thickness t1 of topping rubber on the radially outer side of the band cords is not more than 1.0 mm; a minimum distance d1 from the bottom of the first circumferential groove to the radially outer surface of the band layer is not more than 2.0 mm; and a distance d2 from a groove edge of the first circumferential groove to the radially outer surface of the band layer is not more than 15.0 mm.

19 Claims, 4 Drawing Sheets

(51) Int. Cl.
B60C 11/03 (2006.01)
B60C 9/20 (2006.01)

(52) U.S. Cl.
CPC ............ *B60C 2009/2093* (2013.01); *B60C 2009/2214* (2013.01); *B60C 2009/2238* (2013.01); *B60C 2009/2242* (2013.01); *B60C 2009/2247* (2013.01); *B60C 2009/2252* (2013.01); *B60C 2009/2257* (2013.01); *B60C 2009/2261* (2013.01); *B60C 2009/2276* (2013.01); *B60C 2011/0025* (2013.01); *B60C 2011/0033* (2013.01)

(56) References Cited

U.S. PATENT DOCUMENTS

| | | |
|---|---|---|
| 7,484,545 B2 | 2/2009 | Westgate et al. |
| 2003/0159768 A1* | 8/2003 | Fritsch ............... B60C 9/005 57/238 |
| 2009/0236022 A1* | 9/2009 | Matsuda ............ B60C 15/0018 152/527 |
| 2013/0139940 A1* | 6/2013 | Ito ..................... C08L 61/06 152/451 |
| 2013/0331498 A1* | 12/2013 | Miyazaki ............ C08L 9/00 524/493 |
| 2020/0384809 A1 | 12/2020 | Reese et al. |

FOREIGN PATENT DOCUMENTS

| | | |
|---|---|---|
| JP | 4-314604 A | 11/1992 |
| JP | 6-255312 A | 9/1994 |
| JP | 2011218980 A * | 11/2011 |
| JP | 2018-154075 A | 10/2018 |
| JP | 6848319 B2 | 3/2021 |

OTHER PUBLICATIONS

Extended European Search Report for European Application No. 22791391.0, dated Dec. 20, 2023.
International Search Report (PCT/ISA/210), issued in PCT/JP2022/010235, dated May 24, 2022.
Written Opinion of the International Searching Authority (PCT/ISA/237), issued in PCT/JP2022/010235, dated May 24, 2022.

* cited by examiner

PNEUMATIC TIRE

TECHNICAL FIELD

The present disclosure relates to a pneumatic tire.

BACKGROUND ART

In Patent document 1 below, there has been proposed a pneumatic tire in which a band layer is disposed in a tread portion. And, a hybrid cord obtained by twisting a nylon fiber strand and an aramid fiber strand is used as a band cord of the band layer.

Patent document 1: Japanese Patent Application Publication No. 2018-154075

SUMMARY OF THE INVENTION

Problems to be Solved by the Invention

As described above, a pneumatic tire in which a hybrid cord including materials having different elastic moduli is used as a band cord, can be expected to improve riding comfort and steering stability. In recent years, on the other hand, with the improvement of vehicle performance, pneumatic tires are required to further improve steering stability during high-speed running.

The present disclosure has been devised in view of the above circumstances, and
a primary object thereof is to provide a pneumatic tire in which steering stability at high speeds is improved, while maintaining good ride comfort.

Means for Solving the Problem

The present disclosure is a pneumatic tire having a tread portion, wherein
the tread portion comprises a tread rubber forming a ground contacting surface and a band layer disposed radially inside the tread rubber,
the tread rubber is provided with a first circumferential groove extending continuously in the tire circumferential direction in the ground contacting surface,
the band layer comprises band cords arranged substantially parallel to the tire circumferential direction, and a topping rubber covering the band cords,
the band cords are a hybrid cord in which a first filament and a second filament having an elastic modulus lower than that of the first filament are twisted together,
in a region radially inside the first circumferential groove, a maximum thickness $t1$ of the topping rubber on the radially outer side of the band cord is not more than 1.0 mm,
a minimum distance $d1$ from the bottom of the first circumferential groove to the radially outer surface of the band layer is not more than 2.0 mm,
a distance $d2$ in a tire normal direction from a groove edge of the first circumferential groove to the radially outer surface of the band layer is not more than 15.0 mm.

Effects of the Invention

By employing the above configurations, the pneumatic tire according to the present disclosure can improve steering stability during high-speed running, while maintaining good ride comfort.

DESCRIPTION OF THE SIGNS

2 Tread portion
2G Tread Rubber
9 Band Layer
10 First Circumferential Groove
10e Groove edge
12 Band Cord
13 Topping Rubber
16 First Filament
17 Second Filament

MODE FOR CARRYING OUT THE INVENTION

An embodiment of the present disclosures will be described below with reference to the drawings.

Figure 1:
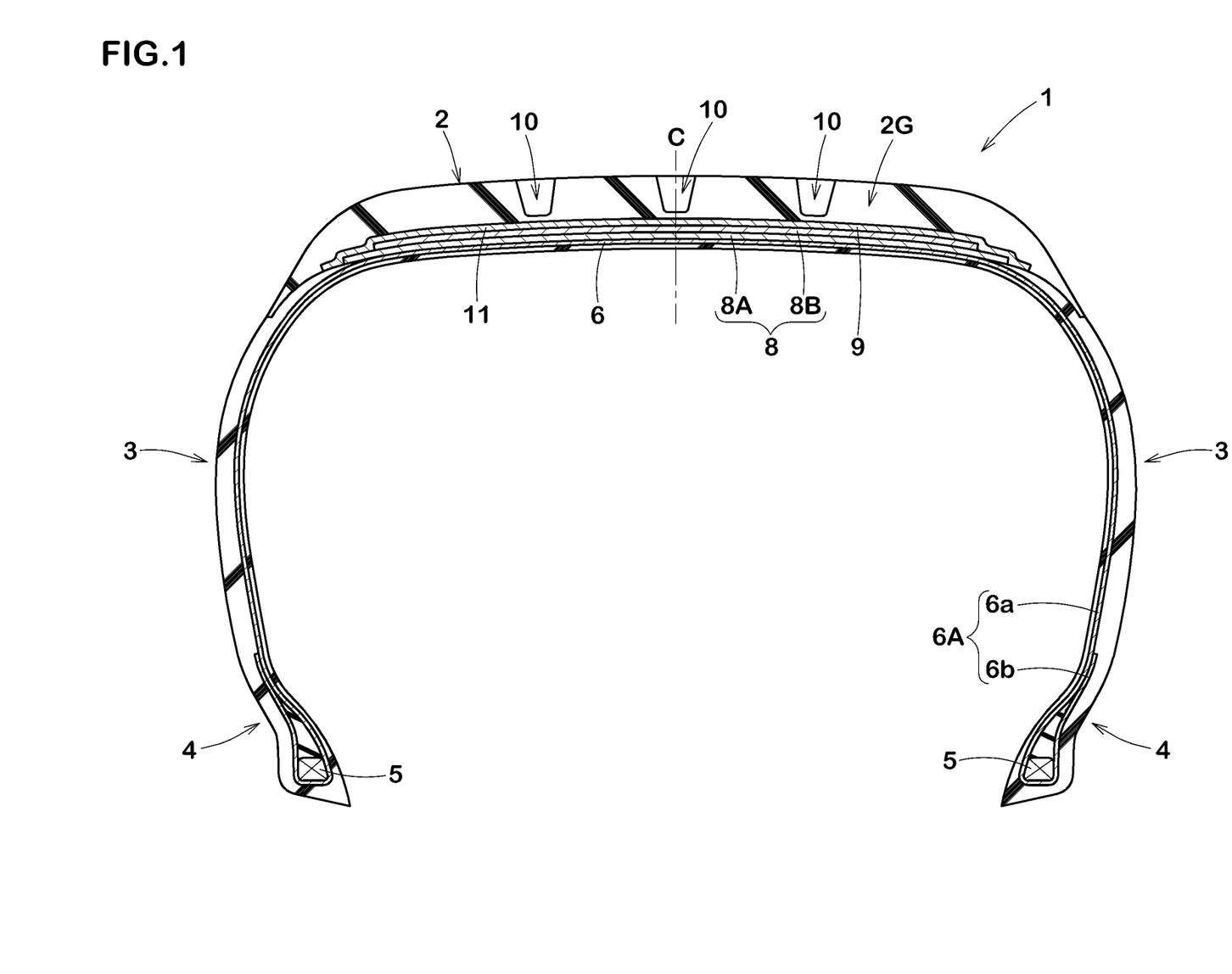
FIG. 1 is a meridian cross-sectional view of a tire as an embodiment of the present disclosure.

FIG. 1 shows a meridian cross-sectional view of a pneumatic tire (hereinafter sometimes simply referred to as "tire") 1 in the present embodiment.

FIG. 1 is a transverse cross-sectional view of the tire 1 under its normal state, including the rotational axis.

As shown in FIG. 1, the tire 1 in the present embodiment is a pneumatic tire for passenger cars. The present disclosure is however, not limited to such embodiment, and may be applied to tires for heavy loads and tires for motorcycles.

The "normal state" means, in the case of a tire for which various standards have been established, that the tire is mounted on a regular rim and inflated to a regular internal pressure but loaded with no load. In the case of a tire for which various standards have not been established, the normal state means a standard usage state according to the purpose of use of the tire, which is a state in which the tire is not mounted on the vehicle and no load is applied.

The "regular rim" is a rim defined for each tire in a standard system that includes standards on which the tire is based, for example, "Standard Rim" in JATMA, "Design Rim" in TRA, and "Measuring Rim" in ETRTO.

The "regular internal pressure" is air pressure specified for each tire by each standard in the standard system including the standards on which the tire is based, and is "maximum air pressure" in JATMA, the maximum value described in the table "TIRE LOAD LIMITS AT VARIOUS COLD INFLATION PRESSURES" in TRA and "INFLATION PRESSURE" in ETRTO.

In this specification, unless otherwise noted, the dimensions of each part of the tire are the values measured under the normal state.

In the case of a component inside the tire that cannot be measured while maintaining its normal state, its dimensions shall be measured while maintaining its shape under the normal state.

Further, in this specification, unless otherwise noted, the composition of each part of the tire means the composition of the material taken out from a new and unused tire.

As the taking-out method at that time, a method that does not change the composition as much as possible is appropriately adopted.

The tire 1 in the present embodiment has a carcass 6. The carcass 6 is composed of, for example, one carcass ply 6A. The carcass ply 6A comprises a plurality of carcass cords, and topping rubber covering them. The carcass cords are arranged, for example, at an angle of 75 to 90 degrees with respect to the tire circumferential direction. Incidentally, "75 to 90 degrees" means "not less than 75 degrees and not more than 90 degrees", and the same applies hereinafter in the present specification.

As the carcass cords, preferably used are organic fiber cords such as nylon, polyester or rayon, and the like.

The carcass ply 6A has a main body portion 6a and a folded portion 6b.

The main body portion 6a extends from one bead portion 4 to the other bead portion 4 through one sidewall portion 3, a tread portion 2 and the other sidewall portion 3.

The folded portion 6b continues from the main body portion 6a, and is folded around a bead core 5 from the inside to the outside in the tire axial direction so as to extend outward in the tire radial direction.

The tread portion 2 of the present embodiment is provided with a belt layer 8.

The belt layer 8 comprises, for example, two belt plies 8A and 8B. For example, each of the belt plies 8A and 8B comprises a plurality of belt cords arranged obliquely with respect to the tire circumferential direction, and a topping rubber covering them.

It is preferable that each belt cord is inclined at an angle of 10 to 45 degrees with respect to the tire circumferential direction.

The tread portion 2 comprises a tread rubber 2G forming a ground contacting surface, and a band layer 9 disposed radially inside the tread rubber 2G.

The tread rubber 2G is provided with at least one first circumferential groove 10 extending continuously in the tire circumferential direction in the ground contacting surface. The tread rubber 2G of the present embodiment is provided with three first circumferential grooves 10.

The groove width of the first circumferential groove 10 is, for example, 3 to 15 mm.

The depth of the first circumferential groove 10 is, for example, 5 to 10 mm.

However, the groove width and groove depth of the first circumferential groove 10 are not particularly limited as long as a certain degree of drainage can be expected during wet running.

Further, the tread rubber 2G may be provided with a second circumferential groove different from the above-described first circumferential groove 10.

Figure 2:
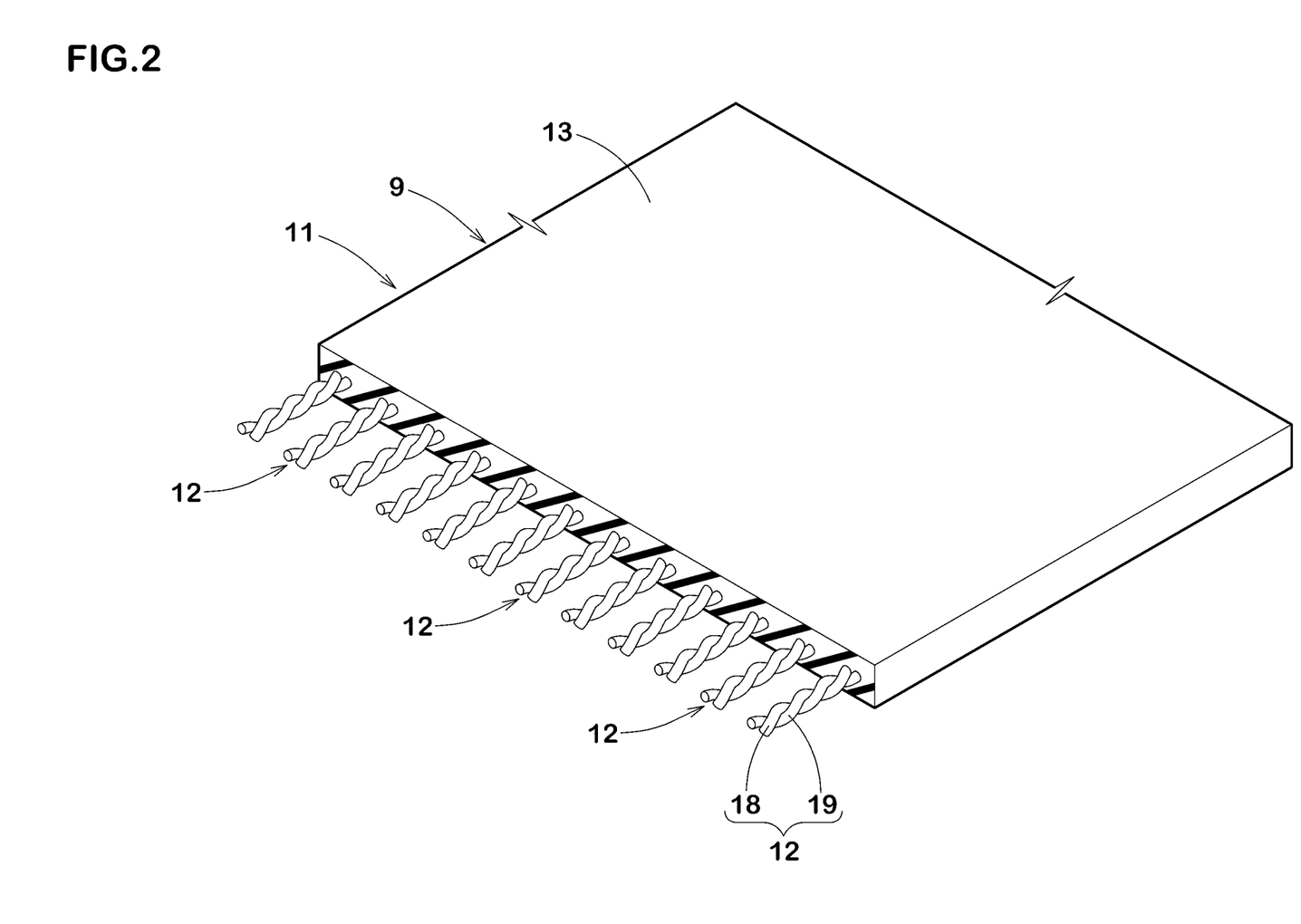
FIG. 2 is an enlarged perspective view of the band ply in FIG. 1.

In FIG. 2, an enlarged perspective view of the band layer 9 is shown.

The band layer 9 is composed of, for example, one band ply 11. The band ply 11 comprises band cords 12 arranged substantially parallel to the tire circumferential direction, and a topping rubber 13 covering the band cords 12.

For example, the band layer 9 may be a plurality of superimposed band plies 11, or a plurality of band plies 11 arranged in the tire axial direction apart from each other. In the present embodiment, the band ply 11 is configured as a so-called jointless band in which, for example, a single band cord is wound in the tire circumferential direction. In another embodiment, the band ply 11 may include a plurality of band cords 12 arranged substantially parallel to the tire circumferential direction.

The expression "the band cord 12 extends substantially parallel to the tire circumferential direction" includes at least such a mode that the band cord 12 extends at an angle of 5 degrees or less with respect to the tire circumferential direction.

Figure 3:
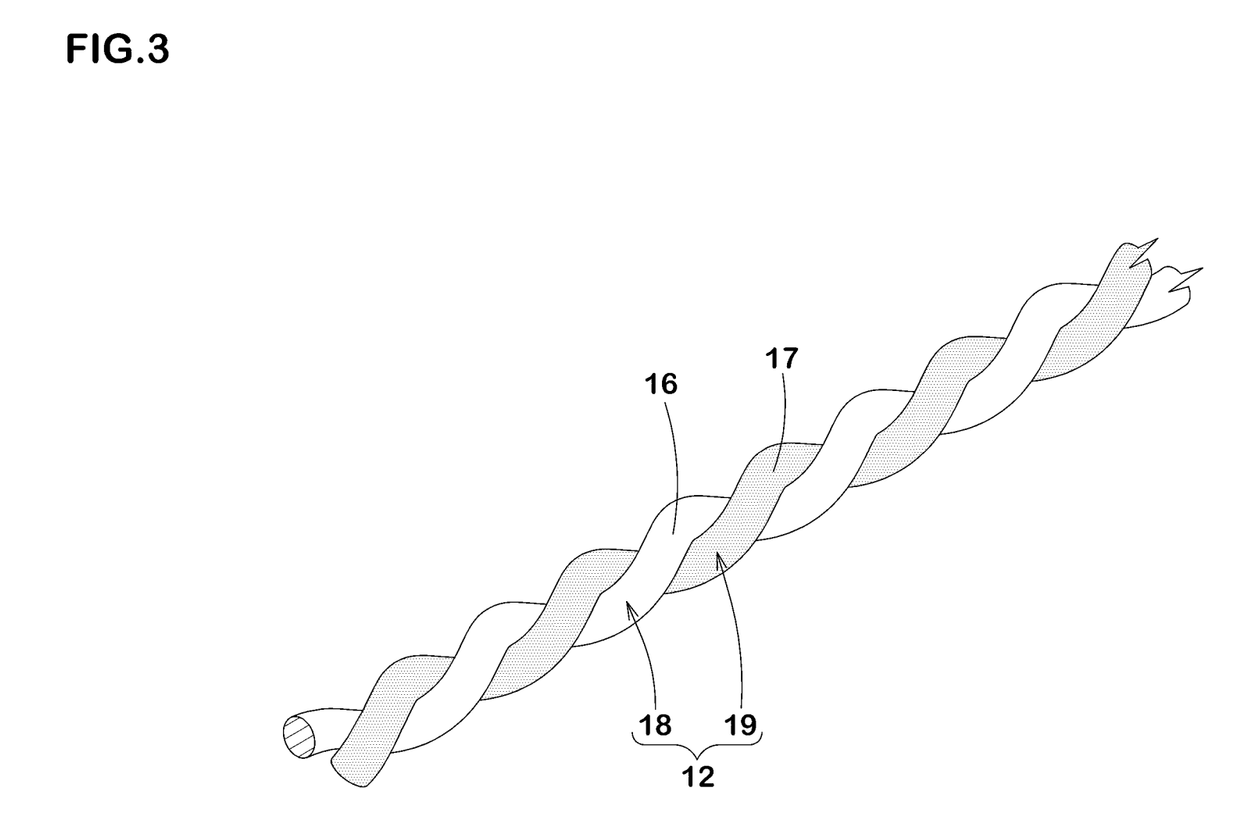
FIG. 3 is an enlarged perspective view of the band cord in FIG. 2.

FIG. 3 shows an enlarged perspective view of the band cord 12.

As shown in FIG. 3, the band cord 12 is a hybrid cord in which a first filament 16 and a second filament 17 which has a smaller elastic modulus than the first filament 16 are twisted together. The first filament 16 and the second filament 17 are made of organic fibers, and materials which have been conventionally used as materials for tire cords such as nylon, aramid and PET, are employed. Thereby, a known hybrid cord is appropriately employed for the band cord 12 of the present embodiment.

Figure 4:
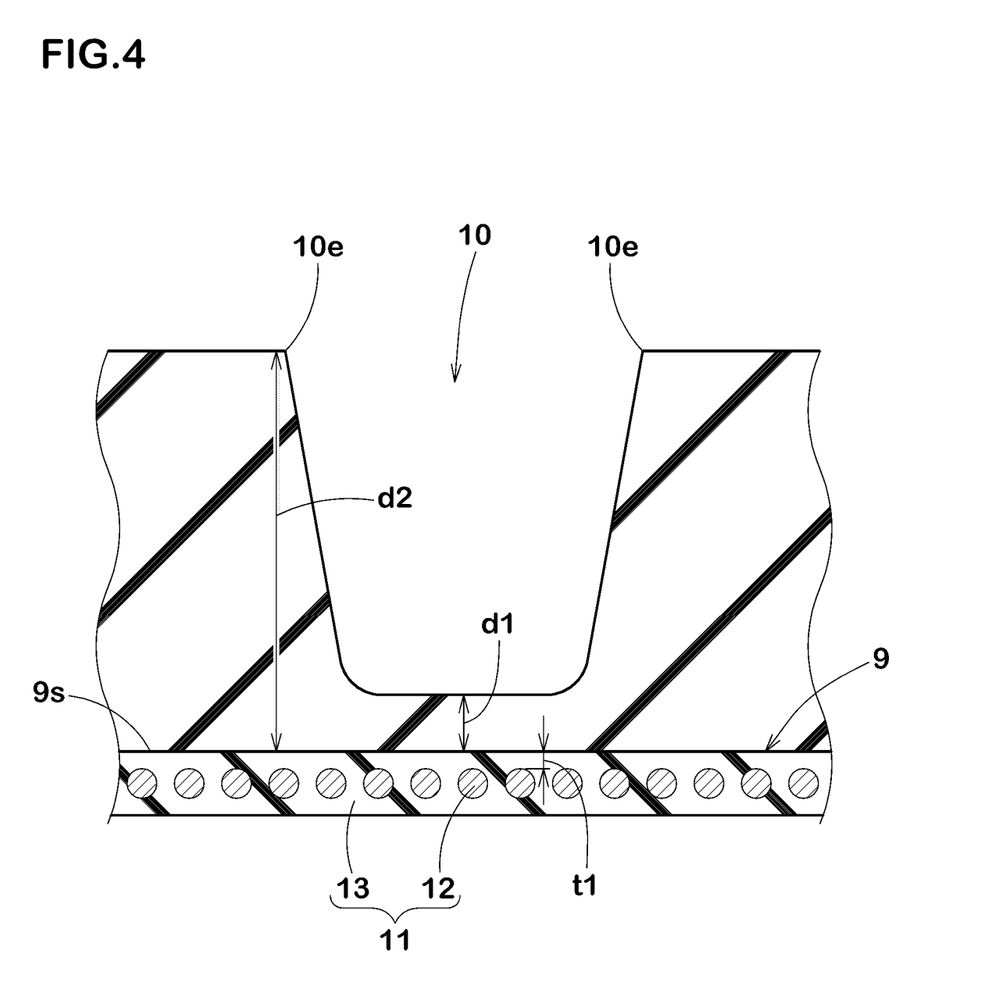
FIG. 4 is an enlarged cross-sectional view of a first circumferential groove and a band layer in FIG. 1.

In FIG. 4, there is shown an enlarged view of the first circumferential groove 10 and the band layer 9. In FIG. 4, the belt layer 8 (shown in FIG. 1) disposed radially inside the band layer 9 is omitted. In FIG. 4, although the cross section of the band cord 12 is simplified and indicated by a circle, it goes without saying that the band cord 12 has the above-described configuration.

According to the present disclosure, as shown in FIG. 4, in a region radially inside the first circumferential groove 10, the maximum thickness t1 of the topping rubber 13 on the radially outside of the band cord 12 is not more than 1.0 mm. Further, the minimum distance d1 from the groove bottom of the first circumferential groove 10 to the radially outer surface 9s of the band layer 9 is not more than 2.0 mm. Furthermore, the distance d2 in the tire normal direction from a groove edge 10e of the first circumferential groove 10 to the radially outer surface 9s of the band layer 9 is not more than 15.0 mm.

The outer surface 9s of the band layer 9 means the outer surface of the topping rubber 13 covering the band cord 12.

The tire normal direction means a direction normal to the ground contacting surface of the tread portion 2.

In this specification, the ground contacting surface of the tread portion 2 means a surface contacting with a plane when the tire 1 under the normal state is contacted with the plane at a camber angle of 0 degrees under the normal load. Further, the groove edge means the boundary between the opening area of the groove and the ground contacting surface. The ground contacting surface and the groove edge can be imaged by a known method such as CT imaging.

In the case of a pneumatic tire for which various standards have been established, the "normal load" is the load defined for each tire by each standard in the standard system including the standards on which that the tire is based, and is "maximum load capacity" in JATMA, the maximum value described in the table "TIRE LOAD LIMITS AT VARIOUS COLD INFLATION PRESSURES" in TRA, and "LOAD CAPACITY" in ETRTO.

In the case of a tire for which various standards have not been established, the "normal load" refers to the load acting on one tire when the tire is in the standard mounting state.

The "standard mounting state" refers to a state in which the tire is mounted on a standard vehicle according to the purpose of use of the tire, and the vehicle is standing still on a flat road surface in a drivable state.

By employing the above configurations, the tire 1 of the present disclosure can improve steering stability during high-speed running while maintaining good ride comfort.

As the reason therefor, it is presumed to be the following mechanism.

In general, the band layer 9 greatly influences the degree of vibration absorption of the tread portion 2 and the degree of outer diameter increase of the tread portion 2.

In other words, the band layer 9 has a great influence on ride comfort during normal running and steering stability during high-speed running.

In the present disclosure, a hybrid cord is used for the band cord 12 of the band layer 9.

Thereby, during normal running in which the outer diameter increase of the tread portion 2 is small, the second filament 17 (shown in FIG. 3, the same applies hereinafter) having a lower elastic modulus becomes dominant, and good riding comfort is maintained.

During high-speed running, the first filament 16 (shown in FIG. 3, the same applies hereinafter) having a higher elastic modulus, suppresses the outer diameter increase of the tread portion 2, and excellent steering stability is exhibited.

The developers have found, as a result of intensive research, that it is possible to further improve the steering stability by specifying the thickness of the rubber around the band layer 9, and have completed the present disclosures.

In the present disclosure, as described above, the thickness t1 is defined as 1.0 mm or less, the distance d1 is defined as 2.0 mm or less, and the distance d2 is defined as 15.0 mm or less. Thereby, the thickness of the rubber on the radially outside of the band cords 12 included in the band layer 9, can be set smaller, and the influence of the centrifugal force acting on the tread portion 2 during high-speed running can be reduced.

Therefore, the increase of the outer diameter of the tread portion 2 is suppressed, the tread profile can be maintained even during high-speed running, and the ground contact of the tread portion 2 is improved.

It is believed that, by the mechanism described above, the present disclosure can improve steering stability during high-speed running while maintaining good ride comfort.

More detailed configurations of the present embodiment will be described below.

Each configuration described below represents a specific aspect of the present embodiment.

Therefore, it goes without saying that the present disclosure can exhibit the above effects, even if it does not have the configurations described below.

Further, even if any one of the configurations described below is applied alone to the tire of the present disclosure having the features described above, an improvement in performance according to each configuration can be expected. Furthermore, when some of the configurations described below are applied in combination, it is possible to expect a combined improvement in performance according to the respective configurations.

As shown in FIG. 3, the band cord 12 of the present embodiment is formed as a multi-twisted structure by twisting together a first yarn 18 formed by twisting first filaments 16 together, and a second yarn 19 formed by twisting second filaments 17 together. However, the band cord 12 is not limited to such a mode, and may have a single twist structure including the first filaments 16 and the second filaments 17.

The difference in elastic modulus between the first filament 16 and the second filament 17 is determined, for example, by tensile strength specified in JIS L1017.

The conditions for measuring the tensile strength are not particularly limited as long as the tensile strength of the first filament 16 and the tensile strength of the second filament 17 are measured under the same conditions.

The total fineness of one band cord 12 is, for example, not more than 4400 dtex, preferably 2000 to 4000 dtex, more preferably 2500 to 3500 dtex.

Such band cord 12 is helpful for improving riding comfort and steering stability in a well-balanced manner.

The stress $\sigma 1$ of the band cord 12 when elongated by 3% is, for example, not more than 0.030 (N/tex). The stress $\sigma 1$ is preferably not less than 0.005 (N/tex), more preferably not less than 0.010 (N/tex), and preferably not more than 0.025 (N/tex), more preferably not more than 0.020 (N/tex).

Such band cord 12 can exhibit excellent ride comfort, while maintaining the durability of the tread portion 2.

The stress $\sigma 2$ of the band cord 12 when elongated by 5% is, for example, not less than 0.04 (N/tex). The stress $\sigma 2$ is preferably not less than 0.043 (N/tex), more preferably not less than 0.045 (N/tex), and preferably not more than 0.06 (N/tex), more preferably not more than 0.055 (N/tex).

Such band cord 12 is helpful for improving ride comfort and steering stability at high speeds in a well-balanced manner.

The ratio $\sigma 1/\sigma 2$ (%) between the stress $\sigma 1$ and the stress $\sigma 2$ is preferably not less than 25%, more preferably not less than 29%, and preferably not more than 50%, more preferably not more than 43%.

The stress $\sigma 1$ and the stress $\sigma 2$ described above are measured, for example, by the method of measuring load under constant extension specified in JIS L1017.

As shown in FIG. 1, the tread rubber 2G is provided with a plurality of first circumferential grooves 10. Further, the tread rubber 2G is provided with a plurality of lateral grooves (not shown) extending in the tire axial direction in the ground contacting surface.

From the viewpoint of achieving both ride comfort and steering stability, the sea ratio of the ground contacting surface of the tread portion 2 is preferably not less than 15%, more preferably not less than 20%, and preferably not more than 50%, more preferably not more than 40%, still more preferably not more than 30%.

Incidentally, the sea ratio is the ratio of the sum of the opening areas of all the grooves to the total area of the virtual ground contacting surface in such a state that all the grooves in the ground contacting surface of the tread rubber 2G are filled up.

It is preferable that the ratio $\sigma 1/\sigma 2$ (%) of the stress $\sigma 1$ (N/tex) when the band cord 12 is stretched by 3% to the stress $\sigma 2$ (N/tex) when the band cord 12 is stretched by 5% is larger than the sea ratio (%) of the ground contacting surface of the tread portion.

Specifically, the ratio $\sigma 1/\sigma 2$ (%) is preferably not less than 1.50 times, more preferably not less than 1.90 times, and preferably not more than 3.00 times, more preferably not more than 2.86 times the sea ratio (%).

Thereby, the ratio $\sigma 1/\sigma 2$ is optimized, and excellent steering stability is exhibited both during low-to-medium speed running and high speed running.

The tread rubber 2G includes, for example, a rubber compound having a complex elastic modulus $E^*1$ of 10 to 20 (MPa) at 30 degrees C.

The complex elastic modulus $E^*1$ is more preferably 12 to 18 (MPa).

On the other hand, in the case of a tire in which riding comfort is important, the complex elastic modulus $E^*1$ at 30 degrees C. of the tread rubber 2G may be not more than 10 (MPa).

The complex elastic modulus E*1 is a value measured using a "viscoelastic spectrometer" manufactured by Iwamoto Seisakusho Co., Ltd. under the following conditions in accordance with JIS-K6394.

As a test sample for measurement, there is used, for example, a rubber piece obtained from the tread rubber 2G so that the long side is in the tire circumferential direction, the short side is in the tire axial direction, and the thickness is in the tire radial direction.

for example, the size of the rubber piece is 20 mm long side×4 mm short side×1 mm thick.

Initial Strain: 10%
Amplitude: +/−1%
Frequency: 8 HZ
Deformation mode: tensile
Measurement temperature: 30 degrees C.

The developers have found, as a result of various experiments, that specifying the complex elastic modulus E*1 of the tread rubber 2G according to the sea ratio, contributes to both ride comfort and steering stability. Specifically, the product of the complex elastic modulus E*1 (MPa) and the sea ratio (%) is preferably not less than 3.0 (MPa), more preferably not less than 4.3 (MPa), and preferably not more than 9.0 (MPa), more preferably not more than 7.5 (MPa).

Thereby, the amount of deformation of the tread portion 2 during running is optimized, and ride comfort and steering stability can be improved in a well-balanced manner.

Further, the product $\sigma2 \cdot E*1$ of the stress $\sigma2$ (N/tex) at 5% elongation of the band cord and the complex elastic modulus E*1 (MPa) is preferably not less than 0.45 (N·MPa/tex), more preferably not less than 0.60 (N·MPa/tex), and preferably not more than 1.05 (N·MPa/tex), more preferably not more than 0.90 (N·MPa/tex).

Thereby, the amount of deformation of the tread portion 2 and the band layer 9 during high-speed running is optimized, and ride comfort and steering stability are improved in a well-balanced manner.

As shown in FIG. 4, the thickness t1 is preferably not less than 0.05 mm, more preferably not less than 0.10 mm, and preferably not more than 0.50 mm, more preferably not more than 0.30 mm. Thereby, the above-mentioned effect can be exhibited while ensuring the durability of the band layer.

The distance d1 is preferably not less than 0.5 mm, more preferably not less than 1.0 mm, and preferably not more than 1.8 mm, more preferably not more than 1.5 mm. Thereby, at the groove bottom of the first circumferential groove 10, the thickness of the rubber is optimized, and the above-described effects are exhibited more reliably.

The distance d2 is preferably not less than 5.0 mm, more preferably not less than 7.0 mm, and preferably not more than 12.0 mm, more preferably not more than 10.0 mm. Thereby, the thickness of the tread rubber 2G is optimized.

The developers have found that the above-described effect can be further improved by specifying the stress $\sigma1$ of the band cord 12 when elongated by 3% and the distance d2 in association with each other.

Specifically, the product $\sigma1 \cdot d2$ of the stress $\sigma1$ (N/tex) and the distance d2 (mm) is preferably 0.05 to 0.40 (N·mm/tex), more preferably 0.08 to 0.18.

Thereby, the amount of deformation of the tread portion 2 during medium to low speed running is optimized, and ride comfort can be further improved.

Similarly, it was found that the steering stability is further improved by specifying the stress $\sigma2$ of the band cord 12 when elongated by 5% and the distance d2 in association with each other.

Specifically, the product $\sigma2 \cdot d2$ of the stress $\sigma2$ (N/tex) and the distance d2 (mm) is preferably 0.30 to 0.60 (N·mm/tex), more preferably, 0.35 to 0.50.

Thereby, the amount of deformation of the tread portion 2 during high-speed running is optimized, and steering stability during high-speed running is further improved.

A ratio t1/d1 (%) between the thickness t1 and the distance d1 is preferably not less than 5%, more preferably not less than 6.7%, and preferably not more than 46.2%, more preferably not more than 30.8%.

Further, it is preferable that the ratio t1/d1 (%) between the thickness t1 and the distance d1 is smaller than the sea ratio (%). Specifically, the ratio t1/d1 (%) is preferably not less than 0.15 times, more preferably not less than 0.26 times, and preferably not more than 0.77 times, more preferably not more than 0.67 times the sea ratio (%). Thereby, the thickness t1 is optimized, and ride comfort is improved while maintaining the durability of the band layer 9.

In addition, it was found that the distance d1 and the complex elastic modulus E*1 have a large effect on ride comfort and steering stability, and it is preferable for improving these performances in a well-balanced manner, to define the distance d1 and the complex elastic modulus E*1 in association with each other.

Specifically, the product of the distance d1 (mm) and the complex elastic modulus E*1 (MPa) is preferably not less than 12.0 (MPa·mm), more preferably not less than 15.0 (MPa·mm), and preferably not more than 30.0 (MPa·mm), more preferably not more than 22.5 (MPa·mm).

Thereby, deformation of the rubber near the groove bottom of the first circumferential groove 10 is optimized, and steering stability during high-speed running can be improved while maintaining good ride comfort.

As shown in FIG. 1, the tread rubber 2G of the present embodiment is provided with three first circumferential grooves 10, and the above-described configuration is satisfied by at least one of the first circumferential grooves 10.

In a more desirable mode, all of the plurality of first circumferential grooves 10 disposed in the tread rubber 2G satisfy the above-described configuration. Thereby, the above-described effects can be reliably exhibited.

while detailed description has been made of an especially preferable embodiment of the present disclosure, the present disclosure can be embodied in various modes without being limited to the illustrated embodiment.

Embodiments

Pneumatic tires of size 215/60R16 satisfying the requirements of the present disclosure were experimentally manufactured based on the specifications shown in Tables 1-4. As Comparative Example 1, a pneumatic tire was experimentally manufactured, wherein a band cord was a hybrid cord, and a thickness t1, a distance d1 and a distance d2 did not satisfy the requirements of the present disclosure.

As Comparative Example 2, a pneumatic tire was experimentally manufactured, wherein a band cord is made of nylon material only, and a thickness t1, a distance d1 and a distance d2 did not satisfy the requirements of the present disclosure.

Except for the specifications shown in Tables 1-4, the tires of Comparative Examples 1 and 2 had configurations substantially the same as those of the tires of Embodiments.

Each test tire was tested for ride comfort and steering stability at high speeds.

The common specifications of the test tires and test methods are as follows.

Mounted rim: 16×6.5J
Internal pressure: 210 kpa
Test vehicle displacement: 2000cc
Drive system: FF
Test tire mounted position: All wheels <Ride Comfort>

Ride comfort when the test vehicle was run on a general road was evaluated by the following method.

Each of 20 test drivers conducted a test drive, and scored the ride comfort on a scale of 1 to 10 points (higher number is better), and the total score of the 20 test drivers was calculated.

The results are indicated by a score based on the sum of the above-mentioned scoring result of Comparative Example 1 being 100, wherein the larger the value, the better the riding comfort.

<Steering Stability During High Speed Running>

Steering stability when the test vehicle was run at high speed, was evaluated by the following method.

Each of the 20 test drivers conducted a test drive, and scored the steering stability on a scale of 1 to 10 points (higher number is better), and the total score of the 20 test drivers was calculated.

The results are indicated by a score based on the sum of the above-mentioned scoring result of Comparative Example 1 being 100, wherein the larger the value, the better the steering stability during high-speed running.

<Comprehensive Performance>

Comprehensive performance including the above-mentioned ride comfort and steering stability at high speeds, was evaluated. The results are the sum of the scores for ride comfort and steering stability during high-speed running, wherein the larger the number, the better the overall performance.

The test results are shown in Tables 1-4.

TABLE 1

|  | Comparative example 2 | Comparative example 1 | Embodiment 1 | Embodiment 2 | Embodiment 3 | Embodiment 4 |
| --- | --- | --- | --- | --- | --- | --- |
| Thickness t1(mm) | 1.2 | 1.2 | 0.1 | 0.4 | 0.6 | 0.8 |
| Distance d1(mm) | 2.2 | 2.2 | 1.3 | 1.3 | 1.3 | 1.3 |
| Distance d2(mm) | 17.0 | 17.0 | 8.0 | 8.0 | 8.0 | 8.0 |
| Total fineness of band cord (dtex) | 3000 | 4400 | 3000 | 3000 | 3000 | 3000 |
| Stress σ1 at 3% elongation of band cord (N/tex) | 0.015 | 0.01 | 0.015 | 0.015 | 0.015 | 0.015 |
| Stress σ2 at 5% elongation of band cord (N/tex) | 0.05 | 0.02 | 0.05 | 0.05 | 0.05 | 0.05 |
| Ratio σ1/σ2 (%) | 30 | 50 | 30 | 30 | 30 | 30 |
| Sea ratio of tread portion (%) | 15 | 15 | 15 | 15 | 15 | 15 |
| (σ1/σ2)/sea ratio | 2.00 | 3.33 | 2.00 | 2.00 | 2.00 | 2.00 |
| Complex elastic modulus E*1 of tread rubber(MPa) | 15 | 15 | 15 | 15 | 15 | 15 |
| E*1 × Sea ratio(MPa) | 4.5 | 7.5 | 4.5 | 4.5 | 4.5 | 4.5 |
| Product σ1 · d2(N · mm/tex) | 0.26 | 0.17 | 0.12 | 0.12 | 0.12 | 0.12 |
| Product σ2 · d2(N · mm/tex) | 0.85 | 0.34 | 0.40 | 0.40 | 0.40 | 0.40 |
| Ratio t1/d1(%) | 54.5 | 54.5 | 7.7 | 30.8 | 46.2 | 61.5 |
| (t1/d1)/Sea ratio | 3.6 | 3.6 | 0.51 | 2.1 | 3.1 | 4.1 |
| Product d1 · E*1 (MPa · mm) | 33.0 | 33.0 | 19.5 | 19.5 | 19.5 | 19.5 |
| Product σ2 · E*1 (N · MPa/tex) | 0.75 | 0.30 | 0.75 | 0.75 | 0.75 | 0.75 |
| Ride comfort (score) | 100 | 96 | 107 | 102 | 101 | 101 |
| Steering stability at high speed (score) | 100 | 91 | 109 | 109 | 107 | 105 |
| Comprehensive performance | 200 | 187 | 216 | 211 | 208 | 206 |

TABLE 2

|  | Embodiment 5 | Embodiment 6 | Embodiment 7 | Embodiment 8 | Embodiment 9 | Embodiment 10 |
| --- | --- | --- | --- | --- | --- | --- |
| Thickness t1(mm) | 1.0 | 0.1 | 0.1 | 0.1 | 0.1 | 0.1 |
| Distance d1(mm) | 1.3 | 0.8 | 1.0 | 1.5 | 2.0 | 1.3 |
| Distance d2(mm) | 8.0 | 8.0 | 8.0 | 8.0 | 8.0 | 7.0 |
| Total fineness of band cord (dtex) | 3000 | 3000 | 3000 | 3000 | 3000 | 3000 |
| Stress σ1 at 3% elongation of band cord (N/tex) | 0.015 | 0.015 | 0.015 | 0.015 | 0.015 | 0.015 |
| Stress σ2 at 5% elongation of band cord (N/tex) | 0.05 | 0.05 | 0.05 | 0.05 | 0.05 | 0.05 |
| Ratio σ1/σ2 (%) | 30 | 30 | 30 | 30 | 30 | 30 |
| Sea ratio of tread portion (%) | 15 | 15 | 15 | 15 | 15 | 15 |
| (σ1/σ2)/sea ratio | 2.00 | 2.00 | 2.00 | 2.00 | 2.00 | 2.00 |
| Complex elastic modulus E*1 of tread rubber(MPa) | 15 | 15 | 15 | 15 | 15 | 15 |
| E*1 × Sea ratio(MPa) | 4.5 | 4.5 | 4.5 | 4.5 | 4.5 | 4.5 |
| Product σ1 · d2(N · mm/tex) | 0.12 | 0.12 | 0.12 | 0.12 | 0.12 | 0.11 |
| Product σ2 · d2(N · mm/tex) | 0.40 | 0.40 | 0.40 | 0.40 | 0.40 | 0.35 |
| Ratio t1/d1(%) | 76.9 | 12.5 | 10.0 | 6.7 | 5.0 | 7.7 |
| (t1/d1)/Sea ratio | 5.1 | 0.83 | 0.67 | 0.44 | 0.33 | 0.51 |
| Product d1 · E*1 (MPa · mm) | 19.5 | 12.0 | 15.0 | 22.5 | 30.0 | 19.5 |
| Product σ2 · E*1 (N · MPa/tex) | 0.75 | 0.75 | 0.75 | 0.75 | 0.75 | 0.75 |
| Ride comfort (score) | 100 | 100 | 101 | 102 | 100 | 100 |
| Steering stability at high speed (score) | 105 | 105 | 107 | 108 | 105 | 109 |
| Comprehensive performance | 205 | 205 | 208 | 210 | 205 | 209 |

TABLE 3

|  | Embodiment 11 | Embodiment 12 | Embodiment 13 | Embodiment 14 | Embodiment 15 | Embodiment 16 | Embodiment 17 |
| --- | --- | --- | --- | --- | --- | --- | --- |
| Thickness t1(mm) | 0.1 | 0.1 | 0.1 | 0.1 | 0.1 | 0.1 | 0.1 |
| Distance d1(mm) | 1.3 | 1.3 | 1.3 | 1.3 | 1.3 | 1.3 | 1.3 |
| Distance d2(mm) | 10.0 | 12.0 | 15.0 | 8.0 | 8.0 | 8.0 | 8.0 |
| Total fineness of band cord (dtex) | 3000 | 3000 | 3000 | 2900 | 3500 | 4400 | 4500 |
| Stress σ1 at 3% elongation of band cord (N/tex) | 0.015 | 0.015 | 0.015 | 0.010 | 0.025 | 0.03 | 0.04 |
| Stress σ2 at 5% elongation of band cord (N/tex) | 0.05 | 0.05 | 0.05 | 0.035 | 0.06 | 0.07 | 0.08 |
| Ratio σ1/σ2 (%) | 30 | 30 | 30 | 29 | 42 | 43 | 50 |
| Sea ratio of tread portion (%) | 15 | 15 | 15 | 15 | 15 | 15 | 15 |
| (σ1/σ2)/sea ratio | 2.00 | 2.00 | 2.00 | 1.90 | 2.78 | 2.86 | 3.33 |
| Complex elastic modulus E*1 of tread rubber(MPa) | 15 | 15 | 15 | 15 | 15 | 15 | 15 |
| E*1 × Sea ratio(MPa) | 4.5 | 4.5 | 4.5 | 4.3 | 6.3 | 6.4 | 7.5 |
| Product σ1 · d2(N · mm/tex) | 0.15 | 0.18 | 0.23 | 0.08 | 0.20 | 0.24 | 0.32 |
| Product σ2 · d2(N · mm/tex) | 0.50 | 0.60 | 0.75 | 0.28 | 0.48 | 0.56 | 0.64 |
| Ratio t1/d1(%) | 7.7 | 7.7 | 7.7 | 7.7 | 7.7 | 7.7 | 7.7 |
| (t1/d1)/Sea ratio | 0.51 | 0.51 | 0.51 | 0.51 | 0.51 | 0.51 | 0.51 |
| Product d1 · E*1 (MPa · mm) | 19.5 | 19.5 | 19.5 | 19.5 | 19.5 | 19.5 | 19.5 |
| Product σ2 · E*1 (N · MPa/tex) | 0.75 | 0.75 | 0.75 | 0.53 | 0.90 | 1.05 | 1.20 |
| Ride comfort (score) | 101 | 100 | 100 | 101 | 100 | 99 | 98 |
| Steering stability at high speed (score) | 107 | 104 | 103 | 104 | 109 | 111 | 114 |
| Comprehensive performance | 208 | 204 | 203 | 205 | 209 | 210 | 212 |

TABLE 4

|  | Embodiment 18 | Embodiment 19 | Embodiment 20 | Embodiment 21 | Embodiment 22 | Embodiment 23 | Embodiment 24 |
| --- | --- | --- | --- | --- | --- | --- | --- |
| Thickness t1(mm) | 0.1 | 0.1 | 0.1 | 0.1 | 0.1 | 0.1 | 0.1 |
| Distance d1(mm) | 1.3 | 1.3 | 1.3 | 1.3 | 1.3 | 1.3 | 1.3 |
| Distance d2(mm) | 8.0 | 8.0 | 8.0 | 8.0 | 8.0 | 8.0 | 8.0 |
| Total fineness of band cord (dtex) | 3000 | 3000 | 3000 | 3000 | 3000 | 3000 | 3000 |
| Stress σ1 at 3% elongation of band cord (N/tex) | 0.015 | 0.015 | 0.015 | 0.015 | 0.015 | 0.015 | 0.015 |
| Stress σ2 at 5% elongation of band cord (N/tex) | 0.05 | 0.05 | 0.05 | 0.05 | 0.05 | 0.05 | 0.05 |
| Ratio σ1/σ2 (%) | 30 | 30 | 30 | 30 | 30 | 30 | 30 |
| Sea ratio of tread portion (%) | 10 | 20 | 30 | 50 | 15 | 15 | 15 |
| (σ1/σ2)/sea ratio | 3.00 | 1.50 | 1.00 | 0.60 | 2.00 | 2.00 | 2.00 |
| Complex elastic modulus E*1 of tread rubber(MPa) | 15 | 15 | 15 | 15 | 9 | 12 | 20 |
| E*1 × Sea ratio(MPa) | 3.0 | 6.0 | 9.0 | 15.0 | 4.5 | 4.5 | 4.5 |
| Product σ1 · d2(N · mm/tex) | 0.12 | 0.12 | 0.12 | 0.12 | 0.12 | 0.12 | 0.12 |
| Product σ2 · d2(N · mm/tex) | 0.40 | 0.40 | 0.40 | 0.40 | 0.40 | 0.40 | 0.40 |
| Ratio t1/d1(%) | 7.7 | 7.7 | 7.7 | 7.7 | 7.7 | 7.7 | 7.7 |
| (t1/d1)/Sea ratio | 0.77 | 0.38 | 0.26 | 0.15 | 0.51 | 0.51 | 0.51 |
| Product d1 · E*1 (MPa · mm) | 19.5 | 19.5 | 19.5 | 19.5 | 11.7 | 15.6 | 26.0 |
| Product σ2 · E*1 (N · MPa/tex) | 0.75 | 0.75 | 0.75 | 0.75 | 0.45 | 0.60 | 1.00 |
| Ride comfort (score) | 100 | 102 | 103 | 105 | 105 | 102 | 98 |
| Steering stability at high speed (score) | 112 | 109 | 105 | 104 | 104 | 105 | 112 |
| Comprehensive performance | 212 | 211 | 208 | 209 | 209 | 207 | 210 |

In Tables 1 to 4, with respect to the ride comfort, when the score is higher than 96 of Comparative Example 2, it can be evaluated as "good ride comfort is maintained." Further, with respect to the steering stability during high-speed running, when the score is higher than 100 of Comparative Example 1, it can be evaluated as the steering stability is improved.

As a result of the test, it was confirmed that the embodiment tires were improved in the steering stability at high speed while maintaining good ride comfort, and improved in the overall performance including the ride comfort and steering stability.

[Appendix]

The present disclosure includes the following aspects.

[Present Disclosure 1]

A pneumatic tire having a tread portion, wherein
the tread portion comprises a tread rubber forming a ground contacting surface, and a band layer disposed radially inside the tread rubber,
the tread rubber is provided with a first circumferential groove extending continuously in the tire circumferential direction in the ground contacting surface,
the band layer comprises band cords arranged substantially parallel to the tire circumferential direction, and a topping rubber covering the band cords,
the band cords are a hybrid cord in which a first filament and a second filament which has an elastic modulus lower than that of the first filament are twisted together, in a region radially inside the first circumferential groove, a maximum thickness t1 of the topping rubber on the radially outer side of the band cord is not more than 1.0 mm, a minimum distance d1 from the bottom of the first circumferential groove to the radially outer surface of the band layer is not more than 2.0 mm, a distance d2 in a tire normal direction from a groove edge of the first circumferential groove to the radially outer surface of the band layer is not more than 15.0 mm.

[Present Disclosure 2]

The pneumatic tire according to Present disclosure 1, wherein the first filament and the second filament are made of organic fibers.

[Present Disclosure 3]

The pneumatic tire according to Present disclosure 1 or 2, wherein the band cord has a total fineness of not more than 4400 dtex.

[Present Disclosure 4]

The pneumatic tire according to any one of Present disclosures 1 to 3, wherein a stress σ1 of the band cord when elongated by 3% is not more than 0.03 (N/tex).

[Present Disclosure 5]

The pneumatic tire according to Present disclosure 4, wherein a product σ1·d2 of the stress σ1 (N/tex) and the distance d2 (mm) is 0.05 to 0.40 (N·mm/tex).

[Present Disclosure 6]

The pneumatic tire according to any one of Present disclosures 1 to 5, wherein a stress σ2 of the band cord when elongated by 5% is 0.04 to 0.06 (N/tex).

[Present Disclosure 7]

The pneumatic tire according to Present disclosure 6, wherein the product σ2·d2 of the stress σ2 (N/tex) and the distance d2 (mm) is 0.30 to 0.60 (N·mm/tex).

[Present Disclosure 8]

The pneumatic tire according to any one of Present disclosures 1 to 7, wherein a sea ratio of the ground contacting surface of the tread portion is 15% to 50%.

[Present Disclosure 9]

The pneumatic tire according to Present disclosure 8, wherein a ratio t1/d1 (%) between the thickness t1 and the distance d1 is smaller than the shear ratio (%).

[Present Disclosure 10]

The pneumatic tire according to any one of Present disclosures 1 to 9, wherein the tread rubber includes a rubber compound having a complex elastic modulus E*1 of not more than 10 (MPa) at 30 degrees C.

[Present Disclosure 11]

The pneumatic according to Present disclosure 10, wherein the product d1·E*1 of the distance d1 (mm) and the complex elastic modulus E*1 (MPa) is 5.0 to 30.0 (MPa·mm).

[Present Disclosure 12]

The pneumatic tire according to Present disclosure 10 or 11, wherein the product σ2·E*1 of the stress σ2 (N/tex) at 5% elongation of the band cord and the complex elastic modulus E*1 (MPa) is 0.40 to 1.60 (N·MPa/tex).

[Present Disclosure 13]

The pneumatic tire according to any one of Present disclosures 10 to 12, wherein the product of the complex elastic modulus E*1 (MPa) and the sea ratio (%) of the ground contacting surface of the tread portion is not more than 5.0 (MPa).

[Present Disclosure 14]

The pneumatic tire according to any one of Present disclosures 1 to 13, wherein a ratio σ1/σ2 (%) of the stress σ1 (N/tex) at 3% elongation of the band cord to the stress σ2 (N/tex) at 5% elongation of the band cord is greater than the sea ratio (%) of the ground contacting surface of the tread portion.

[Present Disclosure 15]

The pneumatic tire according to any one of Present disclosures 1 to 14, wherein the thickness t1 is 0.05 to 0.30 mm, the distance d1 is 0.5 to 1.5 mm, and the distance d2 is 5.0 to 12.0 mm.

The invention claimed is:

1. A pneumatic tire having a tread portion, wherein the tread portion comprises a tread rubber forming a ground contacting surface, and a band layer disposed radially inside the tread rubber, the tread rubber is provided with a first circumferential groove extending continuously in the tire circumferential direction in the ground contacting surface, the band layer comprises band cords arranged substantially parallel to the tire circumferential direction, and a topping rubber covering the band cords, wherein the band cords are each formed by twisting together a first yarn and a second yarn, the first yarn is formed by twisting first filaments together, the second yarn is formed by twisting second filaments together, an elastic modulus of each of the second filaments is lower than an elastic modulus of each of the first filaments, the first filaments and the second filaments are formed from organic fibers, a total fineness of each band cord is not more than 4400 dtex, a stress σ1 of each band cord when elongated by 3% is not more than 0.03 (N/tex), and a stress σ2 of the band cord when elongated by 5% is 0.04 to 0.06 (N/tex), wherein the stress σ1 and the stress σ2 are measured by a method specified in Japanese Industrial Standards (JIS) L1017, in a region radially inside the first circumferential groove, a maximum thickness t1 of the topping rubber on the radially outer side of the band cords is not more than 1.0 mm, a minimum distance d1 from the bottom of the first circumferential groove to the radially outer surface of the band layer is not more than 2.0 mm, and a distance d2 in a tire normal direction from a groove edge of the first circumferential groove to the radially outer surface of the band layer is not more than 15.0 mm.

2. The pneumatic tire according to claim 1, wherein a sea ratio of the ground contacting surface of the tread portion is 15% to 50%, and a ratio σ1/σ2 (%) of the stress σ1 (N/tex) at 3% elongation of the band cord to the stress σ2 (N/tex) at 5% elongation of the band cord is greater than the sea ratio (%) of the ground contacting surface of the tread portion.

3. The pneumatic tire according to claim 1, wherein the thickness t1 is 0.05 to 0.30 mm, the distance d1 is 0.5 to 1.5 mm, and the distance d2 is 5.0 to 12.0 mm.

4. The pneumatic tire according to claim 1, wherein a sea ratio of the ground contacting surface of the tread portion is 15% to 50%.

5. The pneumatic tire according to claim 4, wherein a ratio t1/d1 (%) between the thickness t1 and the distance d1 is smaller than the shear sea ratio (%).

6. The pneumatic tire according to claim 1, wherein the tread rubber includes a rubber compound having a complex elastic modulus $E^*1$ of not more than 10 (MPa) at 30 degrees C.

7. The pneumatic tire according to claim 6, wherein
a sea ratio of the ground contacting surface of the tread portion is 15% to 50%, and
a product of the complex elastic modulus $E^*1$ (MPa) and the sea ratio (%) of the ground contacting surface of the tread portion is not more than 5.0 (MPa).

8. The pneumatic according to claim 6, wherein a product $d1 \cdot E^*1$ of the distance d1 (mm) and the complex elastic modulus $E^*1$ (MPa) is 5.0 to 30.0 (MPa·mm).

9. The pneumatic tire according to claim 8, wherein product $\sigma2 \cdot E^*1$ of the stress $\sigma2$ (N/tex) at 5% elongation of the band cord and the complex elastic modulus $E^*1$ (MPa) is 0.40 to 1.60 (N·MPa/tex).

10. The pneumatic tire according to claim 1, wherein a product $\sigma1 \cdot d2$ of the stress $\sigma1$ (N/tex) and the distance d2 (mm) is 0.05 to 0.40 (N·mm/tex).

11. The pneumatic tire according to claim 5, wherein a product $\sigma2 \cdot d2$ of the stress $\sigma2$ (N/tex) and the distance d2 (mm) is 0.30 to 0.60 (N·mm/tex).

12. The pneumatic tire according to claim 11, wherein
a sea ratio of the ground contacting surface of the tread portion is 15% to 50%, and
a ratio $\sigma1/\sigma2$ (%) of the stress $\sigma1$ (N/tex) at 3% elongation of the band cord to the stress $\sigma2$ (N/tex) at 5% elongation of the band cord is greater than the sea ratio (%) of the ground contacting surface of the tread portion.

13. The pneumatic tire according to claim 11, wherein
the tread rubber includes a rubber compound having a complex elastic modulus $E^*1$ of not more than 10 (MPa) at 30 degrees C.,
a product $d1 \cdot E^*1$ of the distance d1 (mm) and the complex elastic modulus $E^*1$ (MPa) is 5.0 to 30.0 (MPa·mm), and
a product $\sigma2 \cdot E^*1$ of the stress $\sigma2$ (N/tex) at 5% elongation of the band cord and the complex elastic modulus $E^*1$ (MPa) is 0.40 to 1.60 (N·MPa/tex).

14. The pneumatic tire according to claim 13, wherein
a sea ratio of the ground contacting surface of the tread portion is 15% to 50%, and
a product of the complex elastic modulus $E^*1$ (MPa) and the sea ratio (%) of the ground contacting surface of the tread portion is not more than 5.0 (MPa).

15. The pneumatic tire according to claim 11, wherein
a sea ratio of the ground contacting surface of the tread portion is 15% to 50%, and
a ratio t1/d1 (%) between the thickness t1 and the distance d1 is smaller than the sea ratio (%).

16. The pneumatic tire according to claim 15, wherein a ratio $\sigma1/\sigma2$ (%) of the stress $\sigma1$ (N/tex) at 3% elongation of the band cord to the stress $\sigma2$ (N/tex) at 5% elongation of the band cord is greater than the sea ratio (%) of the ground contacting surface of the tread portion.

17. The pneumatic tire according to claim 15, wherein
the tread rubber includes a rubber compound having a complex elastic modulus $E^*1$ of not more than 10 (MPa) at 30 degrees C.,
a product $d1 \cdot E^*1$ of the distance d1 (mm) and the complex elastic modulus $E^*1$ (MPa) is 5.0 to 30.0 (MPa·mm), and
a product $\sigma2 \cdot E^*1$ of the stress $\sigma2$ (N/tex) at 5% elongation of the band cord and the complex elastic modulus $E^*1$ (MPa) is 0.40 to 1.60 (N·MPa/tex).

18. The pneumatic tire according to claim 17, wherein
a sea ratio of the ground contacting surface of the tread portion is 15% to 50%, and
a product of the complex elastic modulus $E^*1$ (MPa) and the sea ratio (%) of the ground contacting surface of the tread portion is not more than 5.0 (MPa).

19. The pneumatic tire according to claim 17, wherein
a sea ratio of the ground contacting surface of the tread portion is 15% to 50%, and
a ratio $\sigma1/\sigma2$ (%) of the stress $\sigma1$ (N/tex) at 3% elongation of the band cord to the stress $\sigma2$ (N/tex) at 5% elongation of the band cord is greater than the sea ratio (%) of the ground contacting surface of the tread portion.

* * * * *